Nov. 4, 1958  J. N. HAIMSOHN ET AL  2,859,249
OXIDATION OF METHYL MERCAPTAN
Filed Jan. 17, 1957
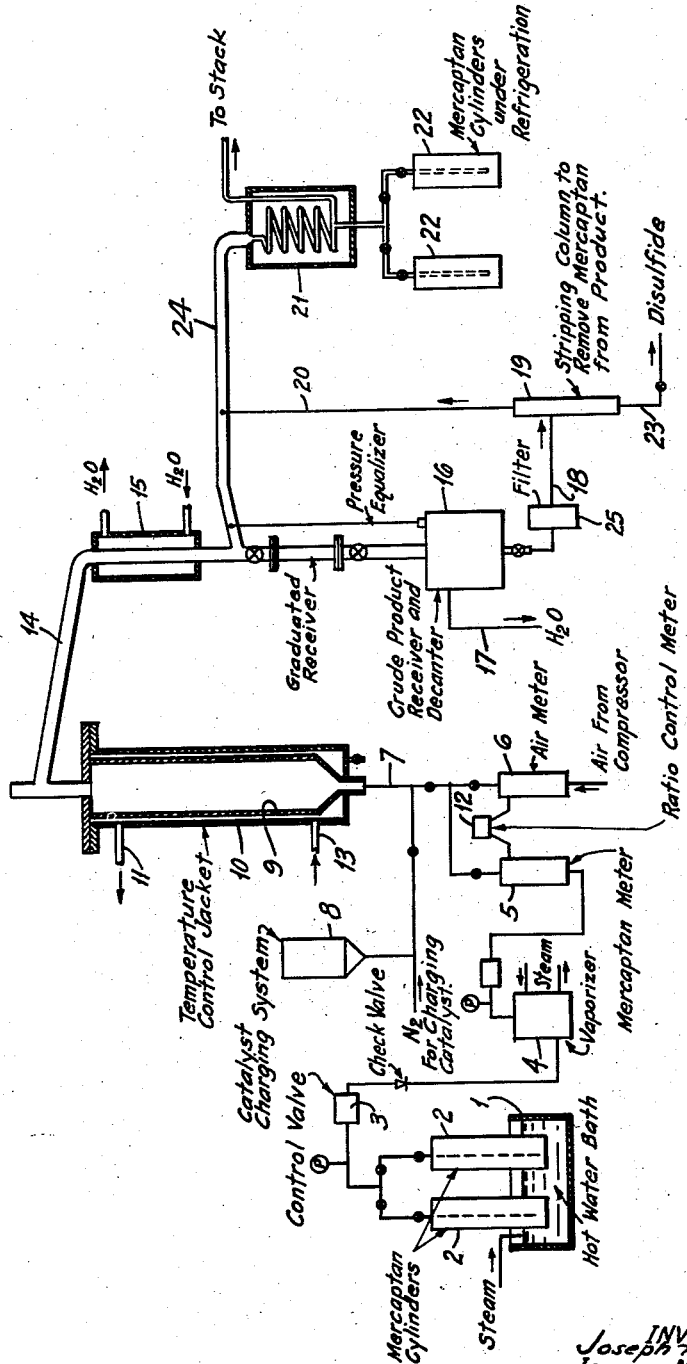
INVENTORS
Joseph T. Barbour
Jerome N. Haimsohn
Joseph T. Kabatin
ECKHOFF & SLICK
ATTORNEYS
BY
A MEMBER OF THE FIRM

2,859,249
OXIDATION OF METHYL MERCAPTAN

Jerome N. Haimsohn, Ardsley, Joseph T. Bashour, New York, and Joseph T. Rabatin, Nyack, N. Y., assignors to Stauffer Chemical Company, a corporation of Delaware Application January 17, 1957, Serial No. 634,791

6 Claims. (Cl. 260—608)

This invention relates to a method of making organic disulfides and particularly lower alkyl disulfides such as dimethyl disulfide.

It is known that methyl mercaptan and an oxygen-containing gas such as air can be reacted by passing them over a solid catalyst to produce dimethyl disulfide. However, when such a process is used with a fixed bed catalyst, the resulting product contains, roughly, 75% of the desired dimethyl disulfide, about 5% of low boiling by-products, and about 20% of high boiling by-products. Such a reaction is ordinarily started by heating the solid catalyst to about 100° C. and passing the mercaptan-air mixture over the catalyst. The reaction is highly exothermic and the reaction rate is such that even at moderate space velocities, a localized hot spot of over 350° C. occurs at the point of first contact of the catalyst with the gas mixture. The excessive localized heat in the catalyst bed is a deleterious factor which results in excess by-product formation and also in decreased catalyst life. It has been found impossible to control this localized heat by conventional heat transfer methods.

Although the invention is described in terms of the manufacture of dimethyl disulfide, it should be understood that the invention is applicable to any of the lower alkyl mercaptans having from 1 to 4 carbon atoms to produce corresponding disulfides. Thus, methyl, ethyl, propyl and butyl mercaptans are suitable starting materials.

In accordance with the present invention, it has been found that by the use of a fluidized catalyst and by controlling the temperature within certain relatively narrow limits, a yield of over 95% of dimethyl disulfide can be obtained with long catalyst life. In accordance with the present invention, the preferred operating temperature is about 200° C., but it may be as low as 170° C. or as high as 270° C. By operating under these conditions with a fluidized catalyst, the organic product of the reaction contains a minimum of 95% dimethyl disulfide and over 15 pounds of the desired product can be made per pound of catalyst without any observable detrimental effect on catalyst activity. Although it is possible to at least partially regenerate a catalyst by passing a steam-air mixture over the catalyst at an elevated temperature, the elimination of regeneration by fluidization which permits selection of the optimum operating temperature is highly desirable as it reduces the expense of carrying out the synthesis. The use of a fluidized catalyst makes possible, when necessary, the removal of spent catalyst and the feeding of fresh or regenerated catalyst in a continuous manner, without interruption or shut-down of the process.

The drawing forming a part of this application comprises a schematic apparatus set-up and a flow sheet of a preferred method of carrying out the reaction of the present invention. In accordance with the flow sheet outlined, a hot water bath 1 is used to maintain temperature, and thus pressure to force liquid mercaptan from the cylinders 2. A control valve 3 is provided for controlling the flow of mercaptan to the vaporizer 4, where it is completely vaporized by heat from a steam coil. The volatilized mercaptan is then passed through a mercaptan meter 5, while air from a compressor (not shown) is passed through an air meter 6, the ratio of the mercaptan to air being controlled by a ratio control meter 12. The mixture of mercaptan and air is then passed through line 7 to the reactor 9. Line 7 also leads to a catalyst charging system 8 so that fresh catalyst or make-up catalyst can be introduced periodically into the reactor so that a suitable amount of an appropriate catalyst is present in the reactor. The reactor 9 is equipped with a jacket 10, which is provided with an inlet 13 and an outlet 11 for steam or other temperature control fluid. The effluent from the reactor 9 is passed through line 14 to a condenser 15, and the condensate is passed through a graduated receiver to the crude product receiver and decanter 16. The water which is formed by the reaction is separated in the decanter 16 and is removed through line 17, while the organic product is taken through line 18 and filter 25 to the stripping column 19. In the stripping column 19, unreacted mercaptan is removed from the product and is passed through line 20 to line 24, where it is combined with the non-condensible effluent from condenser 15, and is passed to the refrigerated condenser 21 and thus the recovered mercaptan is collected in the cylinders 22. The less volatile disulfide is removed from the stripping column 19 as a bottoms through line 23, and is sent to storage. Catalyst carried over from the reactor is collected in the filter 25.

Various oxidation catalysts may be used as are well known to those skilled in the art as useful in promoting this reaction; these include thermally activated bauxite, activated charcoal, nickel oxide, iron oxide, copper oxide and cobalt oxide; see Patents 2,028,303, 2,320,939 and 2,558,221 for suitable catalysts. The catalyst is employed in such finely divided form and the feed rate of the air-mercaptan stream is such that the catalyst is maintained in gaseous suspension in the reactor.

As the oxidizing gas one can use oxygen, air or other oxidizing gases containing free or combined oxygen, e. g. nitrogen oxides or hydrogen peroxide; see Patent 2,028,303.

The following non-limiting examples illustrate preferred methods of carrying out the process of the present invention.

Example 1.—A gaseous mixture containing air and methyl mercaptan in a 1.25:1.0 mole ratio (stoichiometric oxygen) was passed into a reactor containing a fluidized, finely divided thermally activated bauxite catalyst having a particle size range from 80 to 200 mesh at a space rate of 22 cu. ft. per minute per cu. ft. of catalyst at a temperature of 195±5° C. and at about atmospheric pressure. The reaction chamber consisted of a 1″ diameter column 3½ ft. high with a 2″ diameter 3′ high cooling jacket. Heated ethylene glycol was circulated through the reactor jacket, first to preheat the catalyst charge, then to maintain the reaction temperature at 195° C. The reaction chamber was charged with 0.33 lb. of catalyst which resulted in a 12″ static bed height. Under the operating conditions described the expanded catalyst bed height was 18″.

The product gas stream was passed through a water cooled condenser to recover the bulk of the water-dimethyl disulfide product mixture from the reactor effluent gas stream. The residual gas mixture was then cooled to −78° C. in a Dry Ice cold trap and then passed through a 20% caustic scrubber solution to remove the last trace of unreacted mercaptan as the sodium salt. At the termination of the run, the contents of the cold trap were purged through the caustic scrubber to recover the unreacted mercaptan value. The crude dimethyl disulfide product was separated from the water layer and washed with 20% caustic solution to scrub out dissolved methyl mercaptan. The washed crude dimethyl disulfide had a purity of 95% as determined by distillation. The unreacted mercaptan recovery was determined by oxidation of the combined aqueous solutions of the sodium salt to dimethyl disulfide with hydrogen peroxide. The results were as follows for the single pass air oxidation:

[Basis 100 lbs. mercaptan input.]

| | Lbs. |
|---|---|
| Dimethyl disulfide | 81 |
| Unreacted MeSH | 4 |
| High boiler by-product | 4 |
| Mechanical loss | 11 |
| | 100 |

*Example 2.*—The gaseous mixture of Example 1 was reacted at a reaction temperature of 170–175° C., all other process variables being the same as in Example 1.

The overall results were as follows for the single-pass air oxidation:

[Basis 100 lbs. mercaptan input.]

| | Lbs. |
|---|---|
| Dimethyl disulfide | 76 |
| Unreacted MeSH | 14 |
| High boiler by-product | 4 |
| Mechanical loss | 6 |
| | 100 |

An initial conversion to dimethyl disulfide of 80% was obtained. The conversion gradually decreased to 75% when 13 pounds of dimethyl disulfide per pound of catalyst had been produced; and continued to decrease to 70% when 18 pounds disulfide per pound of catalyst had been produced. This decrease in conversion rate was indicative of loss of catalyst activity which did not occur at the temperature employed in Example 1.

*Example 3.*—The process of Example 1 was repeated except that activated cocoanut charcoal was used as the fluidized catalyst. The charcoal was sized as −50+80 U. S. sieve. The reaction chamber was charged with 0.09 lb. of activated cocoanut charcoal which resulted in an 8 inch static bed height. Under operating conditions the expanded catalyst bed height was about 11 inches.

The gaseous mixture of air and methyl mercaptan in an 1.25:1.0 mole ratio (stoichiometric oxygen) was passed into the reactor at a space rate of 25 cu. ft. per min. per cu. ft. of catalyst at a temperature of 196° C. ±5° and at about atmospheric pressure.

The conversion of methyl mercaptan to dimethyl disulfide was 71% in a single pass.

*Example 4.*—The process of Example 1 was repeated except that the catalyst was nickel oxide supported on pumice. It was prepared as follows: A solution of 140 gms. nickelous nitrate hexahydrate in 200 ml. of water was slurried with 140 gms. of ground pumice. The slurry was dried at 120–130° C., with intermittent mixing. The dried solids were then fluidized in an air stream at a temperature of 600° C. for 4 hours to convert the nickel nitrate to nickel oxide. The catalyst as used contained 16.5% nickel, and was sized as −80+150 U. S. sieve.

The reaction chamber was charged with 0.17 lb. of catalyst which resulted in an 8 inch static bed height. Under operating conditions the expanded catalyst bed height was about 11 inches. A gaseous mixture of air and methyl mercaptan in a 1.25:1.0 mole ratio (stoichiometric oxygen) was passed into the reactor at a space rate of 25 cu. ft. per min. per cu. ft. of catalyst at a temperature of 205° C.±5° and at about atmospheric pressure.

A 74% conversion of methyl mercaptan to dimethyl disulfide was obtained in a single pass.

*Example 5.*—The process of Example 1 was repeated except that the catalyst was cobalt oxide supported on pumice. It was prepared as follows: A solution of 140 gms. of cobaltous nitrate hexahydrate in 200 ml. of water was slurried with 140 gms. of ground pumice. The slurry was dried at 120–130° C. with intermittent mixing. The dried solids were then fluidized in a flow of steam at a temperature of 316° C. for 3 hours to convert the cobalt nitrate to cobalt oxide. The catalyst as used contained 15.1% cobalt and was sized as −80+150 U. S. sieve.

The reaction chamber was charged with 0.17 lb. of catalyst which resulted in an 8 inch static bed height. Under operating conditions the expanded catalyst bed height was about 11 inches. A gaseous mixture of air and methyl mercaptan in a 1.25:1.0 mole ratio (stoichiometric oxygen) was passed into the reactor at a space rate of 25 cu. ft. per min. per cu. ft. of catalyst at a temperature of 200° C.±5° and at about atmospheric pressure.

The conversion of methyl mercaptan to dimethyl disulfide was 67% in a single pass.

*Example 6.*—The process of Example 1 was repeated except that the catalyst was iron oxide supported on pumice. It was prepared as follows: A solution of 140 gms. of ferric nitrate nonahydrate in about 200 ml. of water was slurried with 140 gms. of ground pumice. The slurry was dried at 120–130° C. with intermittent mixing. The dried solids were then fluidized in a flow of steam at 316° C. for 3 hours to convert the iron nitrate to iron oxide. The iron content of the catalyst as used was 11.8%. The catalyst was sized as −80+150 U. S. sieve.

The reaction chamber was charged with 0.17 lb. of catalyst which resulted in an 8 inch static bed height. Under operating conditions the expanded catalyst bed height was about 11 inches. A gaseous mixture of air and methyl mercaptan in 1.25:1.0 mole ratio (stoichiometric oxygen) was passed into the reactor at a space rate of 25 cu. ft. per min. per cu. ft. of catalyst at a temperature of 185° C.±5° and at about atmospheric pressure.

A 76% conversion of methyl mercaptan to dimethyl disulfide was obtained in a single pass.

*Example 7.*—The process of Example 1 was repeated except that the catalyst was copper oxide supported on pumice. It was prepared as follows: A solution of 140 gms. of cupric nitrate trihydrate in about 200 ml. of water was slurried with 140 gms. of ground pumice. The slurry was dried at 120–130° C. with intermittent mixing. The dried solids were then fluidized in an air stream at 400° C. for 4 hours to convert the copper nitrate to copper oxide. The copper content of the catalyst as used was 12.4%. The catalyst was sized as −80+150 U. S. sieve.

The reaction chamber was charged with 0.17 lb. of catalyst which resulted in an 8 inch static bed height. Under operating conditions the expanded catalyst bed height was about 11 inches. A gaseous mixture of air and methyl mercaptan in 1.25:1.0 mole ratio (stoichiometric oxygen) was passed into the reactor at a space rate of 25 cu. ft. per min. per cu. ft. of catalyst at a temperature of 197° C.±5° and at about atmospheric pressure.

The conversion of methyl mercaptan to dimethyl disulfide was 57% in a single pass.

This is a continuation-in-part of application Serial No. 499,310, filed April 5, 1955.

We claim:

1. In a process for manufacture of lower alkyl disulfides from lower alkyl mercaptans by catalytic oxidation of the disulfides with a gas containing free oxygen, the improvement consisting in the steps of passing a vapor mixture of said mercaptans and gas upwardly through a mass of finely divided catalyst for the oxidation of said mercaptans to said disulfides and at a rate in relation to said catalyst mass sufficient to maintain said finely divided catalyst in a fluidized condition in a reaction zone, maintaining said reaction zone at a temperature of from about 170° C. to about 270° C., and withdrawing an exit gas stream containing corresponding disulfides.

2. A process as in claim 1 wherein the mercaptan is methyl mercaptan.

3. A process as in claim 2 wherein the catalyst is thermally activated bauxite.

4. A process as in claim 3 wherein the gas containing available oxygen is air and the methyl mercaptan to air molar ratio is about 1.25:1 and the temperature is about 200° C.

5. A process for manufacture of a lower alkyl disulfide from the corresponding lower alkyl mercaptan comprising maintaining a finely divided oxidation catalyst in fluid suspension in a reaction zone, maintaining the temperature of said zone between 170° and 270° C., and introducing a gaseous stream of a free oxygen containing gas and said lower alkyl mercaptan into the bottom of said zone to maintain said catalyst in gaseous suspension in said zone.

6. A continuous process for the manufacture of a lower alkyl disulfide comprising suspending a finely divided oxidation catalyst in a gaseous stream of a lower alkyl mercaptan and a free oxygen containing gas in a reaction zone, and maintaining said zone at a temperature of 170°–270° C.

References Cited in the file of this patent

UNITED STATES PATENTS

| | | |
|---|---|---|
| 2,558,221 | Mertz et al. | June 26, 1951 |
| 2,671,102 | Jewell | Mar. 2, 1954 |